United States Patent [19]

Roller et al.

[11] Patent Number: 4,597,990

[45] Date of Patent: Jul. 1, 1986

[54] PREPARATION OF MAGNETIC RECORDING MEDIA

[75] Inventors: Hermann Roller; Joachim Hack, both of Ludwigshafen; Uwe Woweries, Wachenheim; August Lehner, Roedersheim-Gronau; Werner Graü, Bobenheim-Roxheim; Peter Nagel, Willstaett; Roland Falk, Achern, all of Fed. Rep. of Germany

[73] Assignee: BASF Aktiengesellschaft, Fed. Rep. of Germany

[21] Appl. No.: 769,979

[22] Filed: Aug. 27, 1985

[30] Foreign Application Priority Data

Aug. 31, 1984 [DE] Fed. Rep. of Germany ....... 3432016

[51] Int. Cl.$^4$ .............................................. H01F 10/02
[52] U.S. Cl. .................... 427/130; 427/128; 428/425.9; 428/694; 428/900
[58] Field of Search .............................. 427/128, 130; 428/425.9, 900, 694

[56] References Cited

U.S. PATENT DOCUMENTS 3,144,352  8/1964  Talley et al. ................... 428/900
3,320,090  5/1967  Graubart et al. ............. 428/425.9

FOREIGN PATENT DOCUMENTS 1132956  6/1968  United Kingdom.

*Primary Examiner*—Bernard D. Pianalto
*Attorney, Agent, or Firm*—Keil & Weinkauf

[57] ABSTRACT

A process for the preparation of a magnetic recording medium by dispersing pulverulent magnetic material in a binder mixture which is dissolved in an organic solvent and essentially consists of an elastomeric polyurethane and a high molecular weight hydroxyl-containing polymer, with addition of dispersing assistants and conventional additives, applying a layer of the dispersion, to which a diisocyanate and/or polyisocyanate has first been added, to a base material and the solidifying the layer and crosslinking the binder matrix, wherein the diisocyanate and/or polyisocyanate is added to the dispersion and, before applying the dispersion to the base, from 15 to 55% of the NCO groups present react with the hydroxyl-containing polymer of the binder mixture.

5 Claims, No Drawings

PREPARATION OF MAGNETIC RECORDING MEDIA

The present invention relates to a process for the preparation of magnetic recording media by dispersing pulverulent magnetic material in a binder mixture which is dissolved in an organic solvent and essentially consists of an elastomeric polyurethane and a high molecular weight hydroxyl-containing polymer, with addition of dispersing assistants and conventional additives, applying a layer of the dispersion, to which a diisocyanate and/or polyisocyanate has first been added, to a base material and then solidifying the layer and crosslinking the binder matrix.

Developments in the field of magnetic audio and video recording and data storage make ever-higher demands on the magnetic recording media, while at the same time the desired broad exploitation of this technology demands ever greater reliability of the media. Accordingly, the mechanical properties of the recording media are an important quality criterion. Specifically, the frictional characteristics, abrasion resistance and wear resistance receive special attention. From the point of view of wear resistance, polyurethane elastomers have long been of proven value as layer-forming binders. However, magnetic layers of such composition mostly exhibit a high coefficient of friction which not infrequently leads to blocking of the recording media in the drives. This disadvantage may be due to the high thermoplasticity of the polyurethanes employed. There has therefore been no lack of attempts to improve the coefficients of friction by admixture of hard polymers, such as phenoxy resins, polyvinyl acetals, polyvinyl chloride, polyvinylidene chloride or polycarbonates. Thus, polyurethane elastomers have been combined, inter alia, with vinylidene chloride/acrylonitrile copolymers (U.S. Pat. No. 3,144,352), with vinyl chloride copolymers German Published Application No. DAS 1,282,700 German Laid-Open Application Nos. DOS 2,255,802 and DOS 2,318,910 and also with polyvinylformal German Laid-Open Application No. DOS 2,157,685). A further improvement in the mechanical properties has also been attempted by the use of crosslinked binder systems, ie. by reaction of polymers possessing active hydrogen atoms with diisocyanates and/or polyisocyanates. In these cases, the isocyanate is added to the finished dispersion of polymer or prepolymer and magnetic material and this mixture is subsequently applied to the base material. A possible disadvantage of this method of working is that different atmospheric humidity, fluctuating temperature and slight changes in quality of the starting materials may influence the course of the crosslinking in such a way that unacceptable differences in product properties result. These differences, attributable to the different possible reaction products of the crosslinking, depending on the course of the reaction, primarily affect the mechanical properties of the magnetic layer.

It is an object of the present invention to provide a process for the preparation of magnetic recording media by means of which the mechanical properties of the recording layer are improved while retaining the same quality in respect of the required recording properties, ie. by means of which, in particular, magnetic layers with a low coefficient of friction coupled with high wear resistance are obtained.

We have found that this object is achieved and that the required magnetic recording media can be prepared by dispersing pulverulent magnetic material in a binder mixture which is dissolved in an organic solvent and essentially consists of an elastomeric polyurethane and a high molecular weight hydroxyl-containing polymer, with addition of dispersing assistants and conventional additives, applying a layer of the dispersion, to which a diisocyanate and/or polyisocyanate has first been added, to a base material and then solidifying the layer and crosslinking the binder matrix, if the diisocyanate and/or polyisocyanate is added to the dispersion and, before applying the dispersion to the base, from 15 to 55% of the NCO groups present react with the hydroxyl-containing polymer of the binder mixture.

In a preferred embodiment of the process according to the invention, the ratio of the hydroxyl-containing polymer of the binder mixture to the diisocyanate and/or polyisocyanate is so chosen as to provide from 1 to 9, preferably from 2 to 5, active hydrogens per NCO group.

A large number of the substances known for this purpose may be employed as the diisocyanate and/or polyisocyanate which, according to the process of the invention, is added to the dispersion and reacts partially. For the purposes of the present invention, the term polyisocyanates also includes isocyanate prepolymers with molecular weights of less than 10,000, preferably of from 500 to 3,000. Preferred polyisocyanates for the process according to the invention are those which on average have more than 3, especially from 3 to 6, NCO groups per molecule. Suitable polyisocyanates have proved to be those based on toluylene diisocyanate, hexamethylene diisocyanate or isophorone diisocyanate and formed by polyaddition reaction with diols and triols, or by biuret formation and isocyanurate formation. Adducts of toluylene diisocyanate with trimethylolpropane and diols of 2 to 10 carbon atoms are particularly advantageous if their structure is such as to give a mean functionality of from 3 to 6. Preferred polyisocyanates are those comprising adducts of toluylene diisocyanate with trimethylolpropane and diethyleneglycol and having a mean functionality of from 3 to 5. Advantageous TMP:DEG weight ratios are 60–80:40–20, preferably 65–75:35–25. Biuret isocyanates based on hexamethylene diisocyanate and having a functionality of from 3.5 to 7 are also very advantageous. These biurets may moreover contain urethane groups. Where necessary, the molecular weight and functionality of the polyisocyanates may have to be increased by use of conventional chain lengtheners, for example diols or water.

The binder mixture employed in the process according to the invention for producing the magnetic layer is advantageously composed, prior to crosslinking, of 60–80 parts by weight of an elastomeric polyurethane and 40–20 parts by weight of a high molecular weight hydroxyl-containing polymer. The binder components are employed in solution, with the conventional solvents being employed. These are cyclic ethers, such as tetrahydrofuran and dioxane, and cyclic ketones, such as cyclohexanone. Of course, depending on the field of use, other strongly polar solvents, such as dimethylformamide, N-methylpyrrolidone, dimethylsulfoxide or ethylglycol acetate may also be used. Equally, it is possible to mix the said solvents with aromatics, such as toluene or xylene, and with esters, such as ethyl acetate or butyl acetate.

Suitable polyurethane elastomers and their preparation are described in, for example, German Published Application Nos. DAS 2,442,763 and DAS 2,753,694. Polyurethanes are particularly suitable if they have a K value of from 50 to 70 and a blocking point of not less than 120° C., an elongation at break of from 100 to 1400% (DIN 53,455) and a tensile strength of from 40 to 95 N/mm² (DIN 53,455). If these polyurethanes moreover have terminal OH groups which are readily accessible to crosslinking reactions, then this is a particular advantage.

The hydroxyl-containing physically drying polymers present in the binder mixture are also known. An example is a polyvinylformal binder which has been prepared by hydrolyzing a polymer of a vinyl ester and subsequently reacting the vinyl alcohol polymer with formaldehyde. The polyvinylformals advantageously contain not less than 65% by weight, and more especially not less than 80% by weight, of vinylformal groups. Suitable polyvinylformals contain from 5 to 13% by weight of vinyl alcohol groups and from 80 to 88% by weight of vinylformal groups, and have a specific gravity of about 1.2 and a viscosity of from 50 to 120 centipoise, measured at 20° C. on a solution of 5 g of polyvinylformal in 100 ml of a 1:1 phenol/toluene mixture. Similarly, vinyl chloride/diol monoacrylate, monomethacrylate, diacrylate or dimethacrylate copolymers may be used, these being obtainable, for example, in a manner known per se by solution copolymerization or suspension copolymerization of vinyl chloride and the diol monomethacrylate or monoacrylate. The diol monoacrylate, monomethacrylate, diacrylate or dimethacrylate employed for this purpose is obtained by esterifying acrylic acid or methacrylic acid with the appropriate molar amount of aliphatic diol of 2 to 4 carbon atoms, such as ethylene glycol, butane-1,4-diol and, preferably, propanediol, the propanediol preferably consisting of propane-1,3-diol with from 0 to 50% by weight of propane-1,2-diol. The copolymers advantageously contain from 50 to 95% by weight of vinyl chloride and from 5 to 50% by weight of a diol acrylate or methacrylate. Particularly suitable copolymers preferably contains from 70 to 90% by weight of vinyl chloride and from 10 to 30% by weight of diol monoacrylate or diol monomethacrylate. A 15% strength solution of particularly suitable copolymers, such as vinyl chloride/propanediol monoacrylate copolymers, in a mixture of equal parts by volume of tetrahydrofuran and dioxane has a viscosity of about 30 cP at 25° C. The K value—determined by the method of H. Fikentscher (Cellulosechemie 30 (1931), 58 et seq.)—of the particularly suitable products is from 30 to 50, preferably about 40.

Moreover, phenoxy resins, the structure of which can be described by the recurring formula

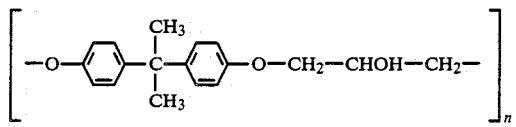

where n is about 100, may advantageously be employed. These are polymers such as those described in German Published Application No. DAS 1,295,011 and known under the trademarks Epikote of Shell Chemical Co. or Epoxy Resin PKHH of Union Carbide Corporation.

Similarly, cellulose ester binders may be used in the binder mixtures described. These cellulose ester binders are esterification products of cellulose with carboxylic acids of 1 to 4 carbon atoms, eg. cellulose acetate, cellulose triacetate, cellulose acetopropionate and cellulose atobutyrate.

The other components required for the preparation, according to the invention, of the magnetic recording media are known.

The magnetic materials used are materials known per se which substantially affect the properties of the resulting magnetic layers, for example gamma-iron(III) oxide, finely divided magnetite, ferromagnetic undoped or doped chromium dioxide, cobalt-modified gamma-iron(III) oxide or ferromagnetic metal particles. Acicular gamma-iron(III) oxide and ferromagnetic chromium dioxide are preferred. The particle size is in general from 0.1 to 2 μm, the range from 0.3 to 0.8 μm being preferred.

The magnetic layer can furthermore, in a manner known per se, contain small amounts of additives, such as dispersants and/or lubricants, but also fillers which are added during dispersion of the magnetic pigments or during the production of the magnetic layer. Examples of such additives are fatty acids or isomerized fatty acids, such as stearic acid, or their salts with metals of main groups I to IV of the Periodic Table of the Elements, amphoteric electrolytes, such as lecithin, as well as fatty acid esters, waxes, silicone oils, carbon black, $\alpha$—$Al_2O_3$, 60 —$Fe_2O_3$, $CrO_2$, ZnO, copolymers based on hydrophilic ethylenically unsaturated monomers etc. The additives are used in the conventional amounts, in general less than 10% by weight, based on the magnetic layer.

The weight ratio of magnetic material to binder mixture is from 1 to 10, more especially from 3 to 6.

The non-magnetic and non-magnetizable bases which may be used are the conventional rigid or flexible bases, especially films of linear polyesters, such as polyethylene terephthalate, in general in gauges from 4 to 200 μm and especially from 10 to 36 μm. More recently, the use of magnetic layers on paper bases has also assumed importance; the coating compositions according to the invention may be used advantageously for this purpose too. To improve the adhesion, the paper bases may be provided with an adhesive layer, where necessary.

An advantageous method of preparing the dispersion is to homogenize the magnetic material, together with a binder solution, the dispersant and the other additives in a disperser, for example a pot mill or stirred ball mill. After satisfactory dispersion has been achieved, the isocyanate component is added to the dispersion, with stirring. In accordance with the invention, the mixture is then stirred until not less than 15 and not more than 55% of the added isocyanate groups have reacted. As a rule this is the case after not more than 6 hours under the chosen production conditions. The NCO conversion is followed by potentiometric measurements. The preliminary crosslinking may be effected either at room temperature, with slow stirring, or, to shorten the reaction time, with heating of the dispersion, for example to 45° C., or with the addition of catalysts conventionally used in polyurethane chemistry, such as dibutyl-tin dilaurate or 1,4-diazabicyclo-(2,2,2)-octane. The sole determining factor is the degree of NCO conversion, which should be within the range described above.

When the desired pre-crosslinking has been achieved, the dispersion is applied to the non-magnetic base by means of the conventional coating devices and methods, for example using a knife coater. Before the liquid coating mixture is dried on the base—such drying being advantageously carried out in 2–5 minutes at from 50° to 90° C.—it is oriented by means of a magnet, in order to achieve good magnetic properties. The magnetic layers can be polished and compressed on conventional machinery, by passing them between heated and polished rolls, where appropriate using pressure, at from 25° to 100° C., preferably from 50° to 80° C. The thickness of the magnetic layer is in general from 1 to 20 $\mu$m, preferably from 4 to 10 $\mu$m. In the case of the production of magnetic tapes, the coated film is slit lengthwise into the usual widths, generally defined in inches.

The pre-crosslinking with diisocyanates and/or polyisocyanates is essential for the advantageous properties of the magnetic recording media produced according to the invention. On average, every second molecule bearing isocyanate groups is linked to the hydroxyl-containing polymer by a urethane or allophane bridge. It is important that the reaction in the dispersion, in which the reactive groups are still freely mobile, takes place more rapidly than the reaction of the isocyanate groups with the water which is introduced by the remaining components of the formulation. In the dry magnetic layer, on the other hand, the unconverted polyisocyanate preferentially reacts with water since the water molecules, for example from the atmosphere, continue to be freely mobile, in contrast to the OH groups of the binders. If there is inadequate crosslinking of the OH groups, such as always occurs if the polyisocyanate is only briefly stirred in or fed in before the mixture is used for coating, the resulting network is too loose-meshed and the urea content too high, with adverse effects on the abrasion resistance and frictional characteristics of the tapes.

In contrast, the process according to the invention, which comprises partial crosslinking in the dispersion and subsequent final crosslinking of the binders in the magnetic layer surprisingly has an advantageous effect on the properties of the resulting magnetic recording media. In particular, the frictional characteristics and especially the mechanical strength of the magnetic layer are improved.

In the Examples and Comparative Examples which follow, parts and percentages are by weight, unless stated otherwise. Parts by volume bear the same relation to parts by weight as that of the liter to the kilogram.

EXAMPLE 1

The following were dispersed for 96 hours in a steel ball mill of 6 liters capacity, filled with 8 kg of steel balls of diameter from 4 to 6 mm: 700 g of $\delta$-iron oxide having a coercive force of 24.5 kA/m, 42 g of oil furnace black, 12 g of soybean lecithin, 865 g of a 12.5% strength solution of a polyurethane elastomer according to German Published Application No. DAS 2,753,694 in equal parts of tetrahydrofuran and dioxane, 232 g of a 20% strength solution of a phenoxy resin, prepared from bisphenol A and epichlorohydrin and still containing 6% by weight hydroxyl groups, in a mixture of equal parts of tetrahydrofuran and dioxane, 1 g of a commercial silicone oil, 1 g of tributoxyethyl phosphate, 2.1 g of n-butylstearate and 737 g of a mixture of equal parts of tetrahydrofuran and dioxane. The mill was then opened and 0.5 g of 1,4-diaza-bicyclo-(2,2,2)-octane was added. After the mill had been closed and dispersing continued for a further hour, the dispersion was taken from the mill and filtered under pressure through a 5 $\mu$m pore filter. After the filtration, 24.5 g, per kg of dispersion, of a 50% strength solution of a triisocyanate obtained from 3 moles of toluylene diisocyanate and 1 mole of trimethylolpropane were stirred in by means of a stirrer. Stirring was continued for 6 hours, with samples being taken from the dispersion at intervals of 2 hours for measurement of the NCO conversion. The latter was determined potentiometrically by the Spielberger method, using n-dibutylamine and HCl. After 6 hours, the NCO conversion was found to be 20.5%, based on the amount of polyisocyanate stirred in. A 36 $\mu$m polyethylene terephthalate film was then coated with the dispersion.

The coated film was passed through a magnetic field to orient the magnetic pigment particles and was then dried at from 50° to 90° C., while at the same time polishing the magnetic layer between rolls heated to 50° C., under a nip pressure of 200 kg/cm. The film was then slit into $\frac{1}{2}$" wide tapes. The thickness of the magnetic layer after drying and calendering was 8 $\mu$m.

The tapers were stored for 8 days at room temperature and then tested for wear resistance and frictional characteristics:

11 cm long pieces of tape were subjected to 50,000 direction reversals on a computer tape transport, type 6347 B, from BASF. The increase in dropouts, the state of the signal wave form, the tape surface and the condition of the magnetic head system were assessed as follows:

The increase in dropouts was minimal; the signal wave form remained virtually unchanged. The tape surface showed barely discernible polishing tracks. Deposits from the tape on the magnetic head were so slight as to be given a rating of 1. As regards the wear resistance, the tape was rated overall to be good or very good.

To assess the frictional characteristics, ie. to check whether the tapes were free from sticking, they were run in a type 3540 transport from Siemens for a total of 2 hours. Every 10 minutes the force prevailing on the tape-transporting capstan was measured in N. This force can vary greatly, between 1 and 30N, depending on the frictional characteristics of the tapes. Tapes with a mean value of up to 5N are, in this measurement, considered to be free from sticking. Tapes with higher values, and especially with values $\geq$ 10N, tend to block on certain designs of transport mechanism, ie. they stick to the magnetic head.

Using this measurement, the tapes produced according to Example 1 show an average friction of 2.8N and can accordingly be described as free from sticking.

COMPARATIVE EXPERIMENT 1

Magnetic tapes were prepared as described in Example 1, but without addition of 0.5 g of 1,4-diazabicyclo-(2,2,2)-octane and with the difference that the dispersion was used for coating 15 minutes after addition of the polyisocyanate. At that stage, the NCO conversion in the dispersion was too low to be measured.

The tapes from the comparative experiment were tested in the manner described in Example 1.

After 50,000 passages, the tape surface was badly scored, with a large increase in dropouts and a marked deterioration in the signal wave form. A great deal of material abraded from the tape had collected on the magnetic head, which was rated 6. The wear resistance was overall assessed inadequate. The frictional characteristics of the tapes were acceptable, the average result being 5N.

COMPARATIVE EXPERIMENT 2

Magnetic tapes were prepared as described in Comparative Experiment 1, except that the dispersion was used for coating 6 hours after addition of the polyisocyanate. The measured NCO conversion was 8.3%. The tests on the tapes gave the following results: after 50,000 passges, the increase in dropouts was slight and the signal wave form was virtually unchanged. The tape surface showed barely discernible polishing tracks. In this respect, the results were rated 1. However, the friction was unsatisfactory, the measured value being 10N. Such tapes can lead to blocking on critical transport mechanisms.

EXAMPLE 2

The following were dispersed for 72 hours in a steel ball mill of 600 liters capacity, filled with 800 kg of steel balls of diameter from 4 to 6 mm: 70 kg of γ-iron oxide having a coercive force of 25 kA/m, 4.5 kg of oil furnace black, 1.2 kg of soybean lecithin, 86.5 kg of a 12.5% strength solution of a polyurethane elastomer according to German Published Application No. DAS 2,753,694 in equal parts of tetrahydrofuran and dioxane, 23.2 kg of a 20% strength solution of a phenoxy resin, prepared from bisphenol A and epichlorohydrin and still containing 6% by weight of hydroxyl groups, in equal parts of tetrahydrofuran and dioxane, 0.1 kg of a commercial silicone oil, 0.1 kg of tributoxyethyl phosphate, 0.21 kg of n-butyl-stearate and 73.7 kg of a mixture of equal parts of tetrahydrofuran and dioxane. The dispersion was taken from the mill and filtered under pressure through a 5 μm pore filter. After it had been filtered, the dispersion was divided between 4 drums, each containing 50 kg, and in each case 0.997 kg of 75% strength solution of a diisocyanate obtained from 3 moles of toluylene triisocyanate and 1 mole of trimethylpropane was first stirred in over 5 minutes with a high-speed stirrer, stirring then being continued for 5 hours at 900 rpm. During this time, the temperature of the dispersion rose to 47° C. After having determined the NCO conversion, which was 31.2% based on the amount of isocyanate stirred in, the dispersion was used for coating as described in Example 1, the product being converted to tapes.

After 50,000 passages of the tape, the increase in dropouts, the signal wave form and the tape surface were all rated 1. The friction was found to be 4N.

EXAMPLE 3

A batch prepared according to Example 1 in a 3 m³ mill was mixed with 1,4-diaza-bicyclo-(2,2,2)-octane, filtered, introduced into a stock vessel of 2 m³ capacity and there pre-crosslinked with the same triisocyanate, in the same amount. After 6 hours, when 23% of the amount of NCO added had been converted, coating was commenced, and was stopped after a further 4 hours, when the entire stock of dispersion had been used up. At that point in time, 35% of the NCO had reacted. No difference in wear resistance was found between the tapes obtained at the beginning and end of the coating run. All were rated 1 overall. The friction was found to be 3.75N and 2.8N respectively. All the tapes were free from sticking.

EXAMPLE 4

700 g of $CrO_2$ having a coercive force of 40 kA/m, 17.5 g of an Na salt of a phosphated nonylphenoxypoly(ethyleneoxy)ethanol compound, 712 g of a solvent mixture of equal parts of tetrahydrofuran and dioxane, 144 g of a 10% strength solution of a polyvinylformal resin in equal parts of tetrahydrofuran and dioxane and 404 g of a 13% strength solution of a polyurethane elastomer according to German Published Application No. DAS 2,753,694 in equal parts of tetrahydrofuran and dioxane were weighed out into a stirred ball mill of 5 liters capacity, filled with 4.2 kg of glass beads of 2 mm diameter, and the mill was then closed and run for 7 hours at 800 rpm. When a sample coating showed that agglomerates were no longer present, the dispersion was mixed with 658 g of the 13% strength solution of the polyurethane elastomer in equal parts of tetrahydrofuran and dioxane, 3.5 g of a commercial silicone oil, 3.5 g of tributoxyethyl phosphate, 3.5 g of isocetyl stearate and 3.5 g of perhydrosqualane were added, the mill was again closed and milling was continued for 13 hours. The dispersion was then taken from the mill and filtered under pressure through a 5 μm pore filter. After filtration, 13.5 g, per kg of dispersion, of a 50% strength solution of a biuret isocyanate based on hexamethylene diisocyanate and having a functionality of from 3.5 to 7 were added. After 1 hour, the NCO conversion was found to be 41%. The dispersion was thereupon applied in a 4 μm layer onto a 23 μm thick polyethylene terephthalate film and dried, and the product calendered, all as described above. The rolls were at 80° C.

Upon testing under the same conditions as the previously mentioned tapes, on a type 6347 B computer transport from BASF, no wear of the magnetic layer was observed. The test tapes were rated 1. The frictional characteristics of the tapes were also satisfactory, a value of <3N being measured.

We claim:

1. A process for the preparation of a magnetic recording medium by dispersing pulverulent magnetic material in a binder mixture which is dissolved in an organic solvent and essentially consists of an elastomeric polyurethane and a high molecular weight hydroxyl-containing polymer, with addition of dispersing assistants and conventional additives, applying a layer of the dispersion, to which a diisocyanate and/or polyisocyanate has first been added, to a base material and then solidifying the layer and crosslinking the binder matrix, wherein the diisocyanate and/or polyisocyanate is added to the dispersion and, before applying the dispersion to the base, from 15 to 55% of the NCO groups present react with the hydroxyl-containing polymer of the binder mixture.

2. A process as claimed in claim 1, wherein the ratio of the hydroxyl-containing polymer of the binder mixture to the diisocyanate and/or polyisocyanate is so chosen as to provide from 1 to 9 active hydrogens per NCO group.

3. A process as claimed in claim 1, wherein the polyisocyanate on average has from 3 to 6 NCO groups per molecule.

4. A process as claimed in claim 1, wherein the polyisocyanate is an adduct of toluylene diisocyanate with trimethylolpropane and diethylene glycol and has a mean functionality of from 3 to 5.

5. A process as claimed in claim 1, wherein the polyisocyanate is a biuret isocyanate based on hexamethylene diisocyanate and having a functionality of from 3.5 to 7.

* * * * *